(12) United States Patent
Nair et al.

(10) Patent No.: US 12,505,141 B2
(45) Date of Patent: Dec. 23, 2025

(54) SYSTEMS AND METHODS FOR BUILDING A DOMAIN-AGNOSTIC ANSWERING SYSTEM USING SUMMARIZATION DRIVEN SCORING

(71) Applicant: UST GLOBAL (SINGAPORE) PTE. LTD., Singapore (SG)

(72) Inventors: Geethi Nair, Aliso Viejo, CA (US); Alla Abdella, Aliso Viejo, CA (US); Adnan Masood, Temple Terrace, FL (US)

(73) Assignee: UST GLOBAL (SINGAPORE) PTE. LTD., Singapore (SG)

( * ) Notice: Subject to any disclaimer, the term of this patent is extended or adjusted under 35 U.S.C. 154(b) by 245 days.

(21) Appl. No.: 17/992,318

(22) Filed: Nov. 22, 2022

(65) Prior Publication Data

US 2024/0168983 A1    May 23, 2024

(51) Int. Cl.
*G06F 16/34* (2025.01)
*G06F 16/31* (2019.01)
*G06F 40/284* (2020.01)

(52) U.S. Cl.
CPC ............ *G06F 16/345* (2019.01); *G06F 16/31* (2019.01); *G06F 40/284* (2020.01)

(58) Field of Classification Search
CPC ...... G06F 16/345; G06F 16/31; G06F 40/284; G06F 40/30
See application file for complete search history.

(56) References Cited

U.S. PATENT DOCUMENTS

| 11,836,175 | B1 * | 12/2023 | Malkiel | G06F 40/30 |
| 2021/0216576 | A1 * | 7/2021 | Staub | G06Q 30/0282 |
| 2022/0083603 | A1 * | 3/2022 | Sisto | G06N 3/0442 |

OTHER PUBLICATIONS

Darapaneni et al., "Building a Question and Answer System for News Domain," 2021 2nd International Conference on Secure Cyber Computing and Communications (ICSCCC), Jalandhar, India, 2021, pp. 78-83, doi: 10.1109/ICSCCC51823.2021.9478180 (Year: 2021).*

Khattab et al., "Relevance-guided Supervision for OpenQA with ColBERT." Transactions of the association for computational linguistics 9 (2021): 929-944 (Year: 2021).*

(Continued)

*Primary Examiner* — Bhavesh M Mehta
*Assistant Examiner* — Jangwoen Lee
(74) *Attorney, Agent, or Firm* — NIXON PEABODY LLP (57) ABSTRACT

A domain-agnostic answering system configured to: (a) receive a question and one or more documents; (b) generate summary representations the one or more documents, each summary representation including a summary having one or more sentences and a score vector; (d) determine that a first summary representation of the summary representations is a winning candidate for extracting an answer to the question; (e) match the first summary representation to a first document in the one or more documents to obtain reference indexes of sentences in the first summary representation in portions of the first document; (f) determine a start logit vector and an end logit vector from the question and the matched first summary representation; and (g) generate a start span and an end span from the start logit vector, the end logit vector, and the score vector associated with the first summary representation, the start span and the end span representing the answer to the question.

20 Claims, 4 Drawing Sheets

(56) References Cited

OTHER PUBLICATIONS

Nguyen et al., "A Hybrid Multi-answer Summarization Model for the Biomedical Question-Answering System." 2021 13th International Conference on Knowledge and Systems Engineering (KSE) (Year: 2021).*
Zhu et al., "Retrieving and reading: A comprehensive survey on open-domain question answering." arXiv preprint arXiv:2101.00774 (2021) (Year: 2021).*
Devlin, J. et al.; "Bert: Pre-training of deep bidirectional transformers for language understanding": Oct. 11, 2018; arXiv:1810.04805 (14 pages).
Goyal, R.; "Evaluation of rule-based, countvectorizer, and word2vec machine learning models for tweet analysis to improve disaster relief"; 2021 IEEE Global Humanitarian Technology Conference (GHTC), pp. 16-19; 2021; DOI: 10.1109/GHTC53159.2021.9612486 (4 pages).
Gururangan, S. et al.; "Don't Stop Pretraining: Adapt Language Models to Domains and Tasks"; Proceedings of the 58 Annual Meeting of the Association for Computational Linguistics, pp. 8342-8360; Jul. 5-10, 2020 (19 pages).
Qiao Jin et al.; "Biomedical Question Answering: A Survey of Approaches and Challenges"; Sep. 9, 2021; arXiv:2102.05281v2; https://doi.org/10.1145/nnnnnnn.nnnnnnn (35 pages).
Möller, T. et al.; "COVID-QA: A Question Answering Dataset for COVID-19"; publication year: 2020 (1 page).
Rajpurkar, P. et al.; "SQuAD: 100,000+ Questions for Machine Comprehension of Text": Oct. 11, 2016; arXiv:1606.05250v3 (10 pages).
Zhu, F. et al.; "Retrieving and Reading: A Comprehensive Survey on Open-domain Question Answering"; May 8, 2021; arXiv.2101.00774v3 (21 pages).

* cited by examiner

SYSTEMS AND METHODS FOR BUILDING A DOMAIN-AGNOSTIC ANSWERING SYSTEM USING SUMMARIZATION DRIVEN SCORING

TECHNICAL FIELD

The present disclosure relates to a document understanding system, and more specifically, to systems and methods for adapting an open-domain question answering system to understand domain-specific knowledge base documents using summarization driven scoring.

BACKGROUND

Machine reading comprehension tasks involve determining whether machines can understand documents by asking the machines questions pertaining to the documents based on the contents of the documents. Machine reading comprehension techniques have taken various forms over the years but can be broadly categorized into two groups. The first is conversational questioning and answering, and the second is open-domain questioning and answering. Conversational questioning and answering are short textual exchanges that typically occur in natural language dialogues. An open-domain questioning and answering attempts to answer questions in natural language by using contents in documents.

Open-domain questioning and answering systems typically combine classical information retrieval techniques with machine comprehension. Information retrieval techniques traditionally use statistical and mathematical methods to find similarities between the questions and answers. Classical information retrieval techniques can take advantage of preprocessing steps, for example, stemming and named entity recognition, to find similarities between question and passage. Classical information retrieval techniques, however, lack the ability to fully interpret or understand documents. The present disclosure provides solutions that improve machine reading comprehension relying on an unsupervised learning framework using weak supervision.

SUMMARY

Some implementations of the present disclosure provide a domain-agnostic answering system. The domain-agnostic answering system includes a non-transitory computer-readable medium storing computer-executable instructions thereon such that when the instructions are executed, the system is configured to: (a) receive a question and one or more documents; (b) generate, via a summarizer, summary representations for each of the one or more documents, each summary representation including a summary having one or more sentences and a score vector including scores for each of the one or more sentences; (c) determine, via a retriever, that a first summary representation of the summary representations is a winning candidate for extracting an answer to the question; (d) match, via the retriever, the first summary representation to a first document in the one or more documents to obtain reference indexes of sentences in the first summary representation in portions of the first document; (e) determine, via a transformer, a start logit vector and an end logit vector from the question and the matched first summary representation; and (f) generate, via an impact matrix, a start span and an end span from the start logit vector, the end logit vector, and the score vector associated with the first summary representation, the start span and the end span representing the answer to the question.

Some implementations of the present disclosure provide a method performed by a domain-agnostic answering system. The method includes: (a) receiving a question and one or more documents; (b) generating, via a summarizer of the domain-agnostic answering system, summary representations for each of the one or more documents, each summary representation including a summary having one or more sentences and a score vector including scores for each of the one or more sentences; (c) determining, via a retriever of the domain-agonistic answering system, that a first summary representation of the summary representations is a winning candidate for extracting an answer to the question; (d) matching, via the retriever, the first summary representation to a first document in the one or more documents to obtain reference indexes of sentences in the first summary representation in portions of the first document; (e) determining, via a transformer of the domain-agonistic answering system, a start logit vector and an end logit vector from the question and the matched first summary representation; and (f) generating, via an impact matrix of the domain-agonistic answering system, a start span and an end span from the start logit vector, the end logit vector, and the score vector associated with the first summary representation, the start span and the end span representing the answer to the question.

Some implementations of the present disclosure provide a non-transitory computer readable medium containing instructions thereon for configuring a domain-agnostic answering system to perform the method comprising: (a) receiving a question and one or more documents; (b) generating, via a summarizer of the domain-agonistic answering system, summary representations for each of the one or more documents, each summary representation including a summary having one or more sentences and a score vector including scores for each of the one or more sentences; (c) determining, via a retriever of the domain-agonistic answering system, that a first summary representation of the summary representations is a winning candidate for extracting an answer to the question; (d) matching, via the retriever, the first summary representation to a first document in the one or more documents to obtain reference indexes of sentences in the first summary representation in portions of the first document; (e) determining, via a transformer of the domain-agonistic answering system, a start logit vector and an end logit vector from the question and the matched first summary representation; and (f) generating, via an impact matrix of the domain-agonistic answering system, a start span and an end span from the start logit vector, the end logit vector, and the score vector associated with the first summary representation, the start span and the end span representing the answer to the question.

The foregoing and additional aspects and implementations of the present disclosure will be apparent to those of ordinary skill in the art in view of the detailed description of various embodiments and/or implementations, which is made with reference to the drawings, a brief description of which is provided next.

BRIEF DESCRIPTION OF THE DRAWINGS

The foregoing and other advantages of the present disclosure will become apparent upon reading the following detailed description and upon reference to the drawings.

While the present disclosure is susceptible to various modifications and alternative forms, specific implementations have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the present disclosure as defined by the appended claims.

DETAILED DESCRIPTION

Due to information retrieval processes lacking document understanding, modern natural language processing models have begun to capture contextual semantics of passages. In some examples, deep learning and natural language processing approaches, like word embeddings and attention networks, can help in capturing contextual semantics. Bi-directional recurrent neural networks and long short term memory can be used as building blocks to capture context of documents. Although these techniques have led to advances in machine comprehension, questioning, and answering, transfer learning can be difficult to achieve. Furthermore, in some cases, these techniques can return null or zero outputs, indicating that the techniques fail in providing an answer to a question.

Embodiments of the present disclosure provide a domain-agnostic answering system that does not return zero outputs. That is, the domain-agnostic answering system always provides an answer. Embodiments of the present disclosure provide several advantages over conventional methods. For example, no extensive training is involved in understanding and ranking answers. Summarizers and transformer based models are used in selecting answers, and an impact matrix is used to determine likelihood of a predicted answer being in a specific location in a document. Furthermore, conventional methods do not always provide the right answer, therefore, the impact matrix combined with the summarizer improves upon the answers determined using conventional means.

Figure 1:
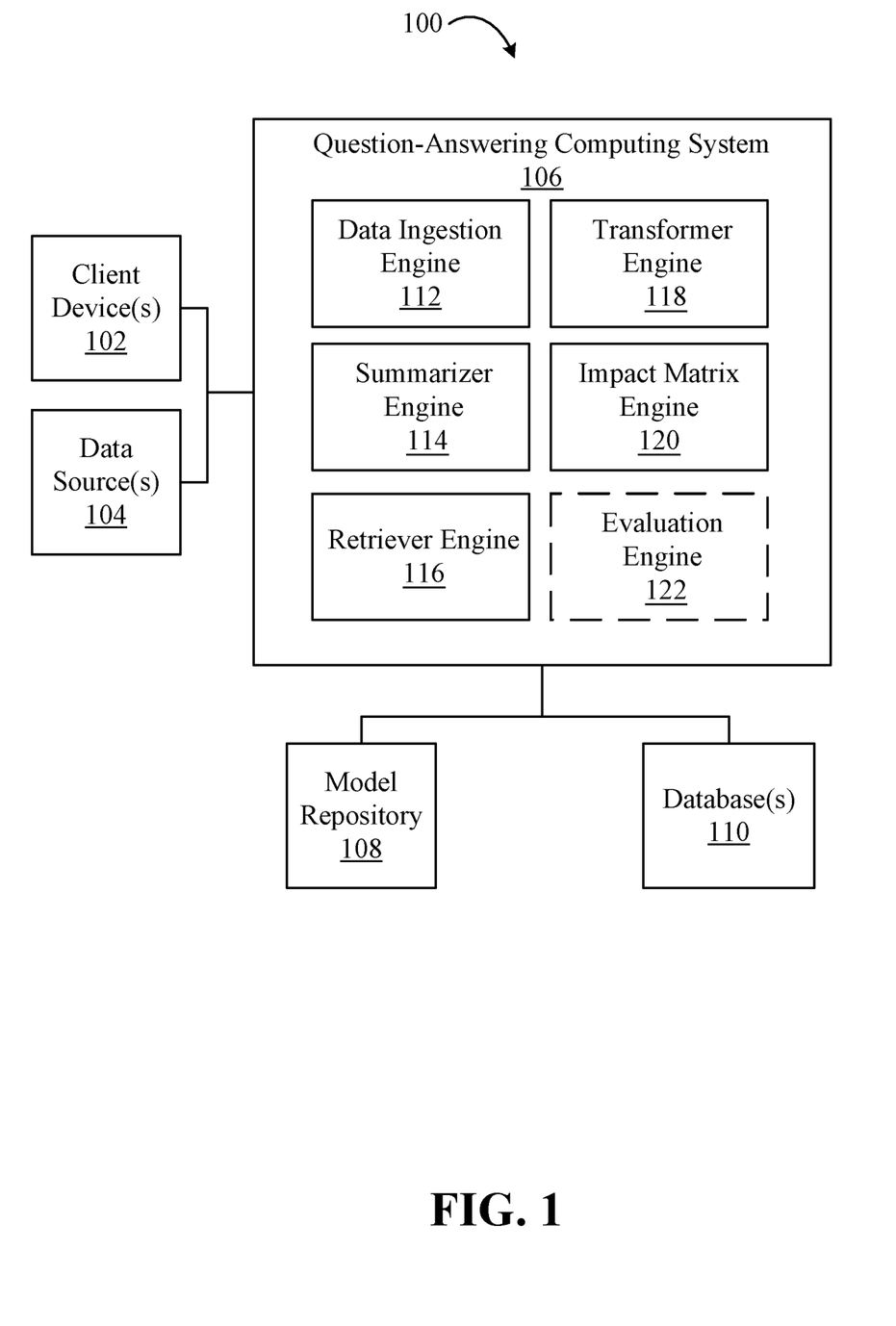
FIG. 1 illustrates a block diagram of a domain-agnostic answering system, according to some implementations of the present disclosure.

FIG. 1 illustrates a block diagram of a domain-agnostic answering system 100, according to some implementations of the present disclosure. To simplify discussion, the singular form will be used for components identified in FIG. 1 when appropriate, but the use of the singular does not limit the discussion to only one of each such component. The domain-agnostic answering system 100 includes a client device 102, one or more data sources 104, a question-answering computing system 106, a model repository 108, and/or a database 110. In some implementations, the data sources 104 and/or the model repository 108 is part of the database 110. Each of these components can be realized by one or more computer devices and/or networked computer devices. The computer devices include at least one processor with at least one non-transitory computer readable medium.

Figure 2:
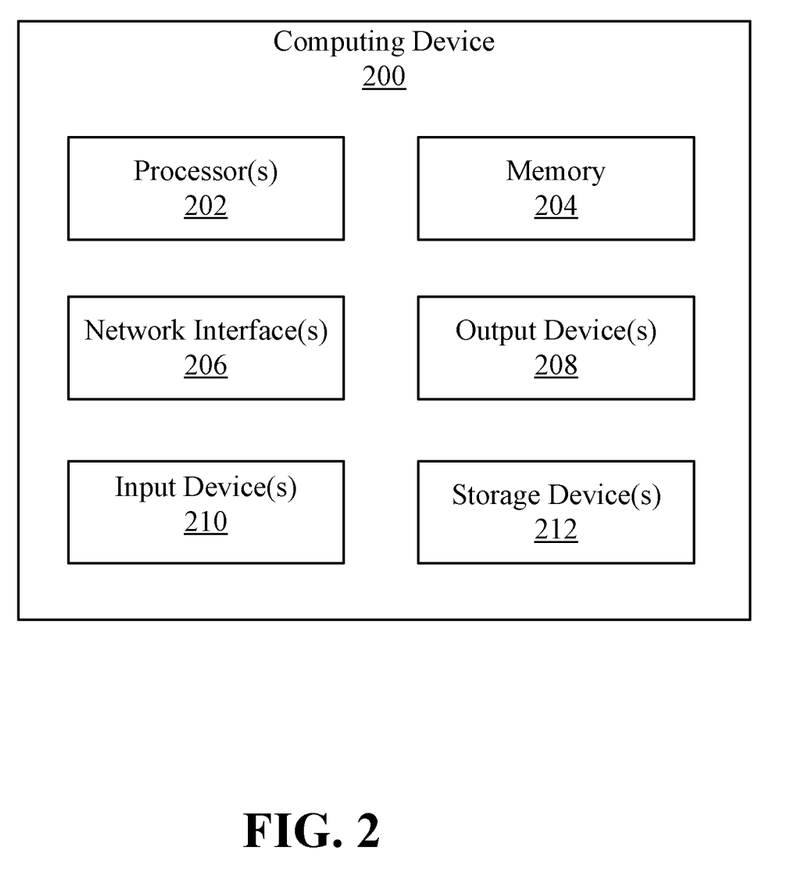
FIG. 2 illustrates a block diagram of a computing device, according to some implementations of the present disclosure.

The client device 102 is a computing device (e.g., computing device 200 of FIG. 2). The client device 102 can provide one or more queries or questions to the question-answering computing system 106. In some implementations, the client device 102 provides the queries in a command line, one by one. In some implementations, the client device 102 provides the queries in batches, for example, by using a text file or by entering multiple queries on the command line. In some implementations, the client device 102 transcribes a recording of the queries to text format and sends the transcribed text to the question-answering computing system 106. In some implementations, the client device 102 relies on optical character recognition (OCR) to read the queries from a scanned document to a text file. In some implementations, the client device 102 is a desktop computer, a laptop computer, a smartphone, a smart speaker, etc.

The one or more data sources 104 can store structured and/or unstructured data. Examples of structured data include formatted articles, tables, invoices, etc. Examples of unstructured data sources include documents not organized as key-value pairs, documents in a human's penmanship, etc. The one or more data sources 104 can include an online encyclopedia, a journal article repository, user manuals, hospital manuals, news articles, blog posts, frequently asked questions, etc. For ease in readability, henceforth, data stored by the one or more data sources 104 are referred to as documents. Examples of documents include one or more articles, one or more books, one or more manuals, one or more writings, etc. Documents can also be referred to as contexts, in keeping with terminology in the technical field. As such, documents and contexts are used interchangeably herein. Documents and contexts can include a single paragraph (having one or more sentences) or multiple paragraphs.

The question-answering computing system 106 is configured to receive one or more documents and/or one or more questions. The question-answering computing system 106 can retrieve the one or more documents and/or the one or more questions from the data source 104. In some implementations, the question-answering computing system 106 receives the one or more questions from the client device 102. The question-answering computing system 106 provides answers to the one or more questions to the client device 102. In some implementations, the question-answering computing system 106 identifies specific documents from the one or more documents and specific locations within the specific documents where the answers to the one or more questions are found. The question-answering computing system 106 can use items stored in the model repository 108 and the database 110 to determine the answers to the one or more questions.

The question-answering computing system 106 includes a data ingestion engine 112. An engine is a combination of hardware and software configured to perform specific functionality. The data ingestion engine 112 formats the one or more documents and/or the one or more questions received from the client device 102 and/or the data source 104. The data ingestion engine 112 can format the one or more documents and/or the one or more questions into question-answer (QA) representations. In some implementations, the QA representation is a SQuAD representation. That is, in some implementations, the QA representation can take the form of (question, context, answer). In some implementations, the QA representation can take on the form of (question, context). In some implementations, the QA representation is merely the context that has been prepared for further processing. The context can be prepared and stored in the database 110.

The question-answering computing system 106 further includes a summarizer engine 114. The summarizer engine 114 generates summary representations from the QA representation. For example, if the QA representation takes on the form of (question, context), then the summarizer engine 114 generates summary representations for each context in the QA representation. In some implementations, the summarizer engine 114 determines a sentence score for each sentence in a context. The summarizer engine 114 ranks the sentences in the context by the sentence scores and selects "n" sentences with top sentence scores to generate the summary representation. "n" is a number that is greater than or equal to 1 and can be customized based on settings of the summarizer engine 114. In some implementations, "n" is chosen to be a percentage of the total number of sentences in the context. For example, "n" can be chosen to be 80% of the total number of sentences in the context. If "n" is greater than the total number of sentences in the context, then the context and the summary will have the same number of sentences. In some cases, even if the context and summary have the same number of sentences, the order of the sentences in the summary and context can differ.

In an example, the QA representation contains (question1, context1), (question1, context2), (question1, context3), and (question1, context4). In some implementations, context1, context2, context3, and context4 are four separate documents. In some implementations, context1 and context2 are from the same document based on processing standards (e.g., a long document can be divided into multiple parts and processed as two or more contexts). In some implementations, if the length of a document or context exceeds 512 tokens, then the document or context is divided into multiple parts. A token is a word in the context or document. The summarizer engine 114 receives the QA representations and generates summary representations. Referring back to the example, the summary representations include (summary 1, score1), (summary2, score2), (summary3, score3), and (summary4, score4). The summary representations include a score vector and one or more sentences that summarizes each of the respective contexts. That is, summary1 is a summary of context1, summary2 is a summary of context2, summary3 is a summary of context3, and summary4 is a summary of context4. The score vector score1 includes scores associated with sentences in summary1, the score vector score2 includes scores associated with sentences in summary2, the score vector score3 includes scores associated with sentences in summary3, and the score vector score4 includes scores associated with sentences in summary4.

In some implementations, the summarizer engine 114 retrieves summarizer models from the model repository 108. The summarizer models can include extractive summarizers that extract original text from the contexts in the QA representations. The summarizer models can be fuzzy-based summarizers, machine learning summarizers, statistically based summarizers, etc. The summarizer model can be a TextRank model, a term frequency—inverse document frequency (TF-IDF), latent semantic analysis, RIPTIDES, pattern-based summarizer, feed forward neural networks, etc. The summarizer model used affects which sentences in a context are selected for crafting a summary of the context, the scores associated with the sentences included in the summary of the context, and so on.

In some implementations, the contexts generated for the QA representation are stored in the database 110. The summary representations associated with the contexts are stored in the database 110. Once generated, the summary representations can be linked to the contexts such that the database 110 includes contexts and their associated summaries. In some implementations, the score vectors that includes scores for each sentence in the associated summaries is also stored in the database 110.

The question-answering computing system 106 further includes a retriever engine 116. The retriever engine 116 determines from the summaries generated by the summarizer engine 114, a winning candidate having an answer to a given question. For example, if the summarizer engine 114 provides summary representations that include (summary 1, score1), (summary2, score2), (summary3, score3), and (summary4, score4), the retriever engine 116 can take as input each of the summary representations and (question1) and determine which of the summary representations represents a context that may include an answer to question1. By searching summary representations instead of contexts, the search span for the retriever engine 116 is reduced. An advantage to searching the summary representations and reducing the search span is that the speed of retrieving the span of the answers is improved.

In some implementations, the summary representation is determined from an extractive summarizer. Therefore, the sentence(s) included in the summary representation are verbatim from the documents ingested by the data ingestion engine 112. That is, the summary representation selected as the winning candidate is a subset of the QA representation. For example, the QA representations contain (question1, context1), (question1, context2), (question1, context3), and (question1, context4), corresponding to summary1, summary2, summary3, and summary4. If summary3 is chosen as the winning candidate, then the retriever engine 116 can provide context3 as the context where the answer to question1 lies. That is, the retriever engine 116 determines a winning candidate (i.e., a summary) and selects a context associated with the winning candidate for further processing.

The retriever engine 116 can further match summary3 to specific locations within context3 through index matching. As discussed above, the summarizer engine 114 selects sentences to be included in the summary based on a scoring and ranking system. As such, the sentences in the summary can appear in a different order when compared to how the sentences are ordered in the originating context. Furthermore, the sentences, as appearing in the context, may be separated by other sentences with lower scores that were not included in the summary. Therefore, index matching allows identifying specific locations within the context where specific sentences lie.

The question-answering computing system 106 further includes a transformer engine 118. The transformer engine 118 determines, from the context associated with the winning candidate and the question, location(s) within the context associated with winning candidate that contain an answer to the question. Preferably, the transformer engine 118 determines the answer from the winning candidate, and based on the index matching performed by the retriever engine 116, the answer is cast as specific location(s) within the context associated with the winning candidate. The transformer engine 118 uses a transformer model that may be stored in the model repository 108. In some implementations, the transformer model is an encoder-decoder network. In some implementations, the transformer engine 118 employs bidirectional encoder representations from transformers (BERT) model in determining the location(s) that contain the answer to the question. The BERT model can provide start logits and end logits that span the answer within the context associated with the winning candidate.

The question-answering computing system 106 further includes an impact matrix engine 120. The impact matrix engine 120 receives the start logits and end logits from the transformer engine 118. The impact matrix engine 120 also receives the summarizer scores (i.e., the score vector associated with the winning candidate) from the summarizer engine 114. Using the start logits, end logits, and summarizer scores, the impact matrix engine 120 generates a start span and an end span from the context associated with the winning candidate selected by the retriever engine 116. In some implementations, the impact matrix engine 120 generates a set of score adjustments that adjust potential answer tokens using a penalty function. That is, the impact matrix engine 120 generates a set of score adjustments that modifies the start logits and/or end logits to obtain the start span and/or the end span. Adjusting the start logits and/or end logits adds and/or removes words (i.e., tokens) from the answer.

In some implementations, the penalty function is an l×l impact matrix, with rows and columns of the impact matrix corresponding to penalties associated with starting and ending an answer at a particular position in the context associated with the winning candidate (i.e., the chosen context from the retriever engine 116). The impact matrix's elements $m_{ij}$ are computed as the sum of two components. The first component is the start logit and end logit values obtained from the transformer engine 118. The second component is the sum of all scores between the interval i and j. In some implementations, limits can be placed on the l×l impact matrix to reduce computational complexity and remove invalid spans. As will be described below in connection with FIG. 3, the impact matrix can be used to determine a non-zero span within the chosen context that contains the answer to the question.

Optionally, the question-answering computing system 106 can include an evaluation engine 122. The evaluation engine 122 can receive feedback from the client device 102 and/or the data source 104 to gauge accuracy of the answer determined by the impact matrix engine 120. In some implementations, output from the evaluation engine 124 can be used to adjust parameters associated with the impact matrix engine 120. In some implementations, the evaluation engine 122 gauges accuracy via one or more metrics. These metrics include, for example, one or more of F1 scores, precision scores, recall scores, exact match (EM) scores, bilingual evaluation understudy (BLEU) scores, etc.

FIG. 2 illustrates a block diagram of a computing device 200, according to some implementations of the present disclosure. The computing device 200 is illustrated as one such device, but based on implementation, multiple such devices can be networked or formed in a cluster to implement one or more components illustrated in FIG. 1. The computing device 200 can be used in realizing any one of the client device 102, the data source 104, the question-answering computing system 106, the model repository 108, and/or the database 110. The computing device 200 may include one or more processors 202, memory 204, network interfaces 206, output devices 208, input devices 210, and storage devices 212. Although not explicitly shown in FIG. 2, each component provided is interconnected physically, communicatively, and/or operatively for inter-component communications in order to realize functionality of the different components of FIG. 1. To simplify the discussion, the singular form will be used for all components identified in FIG. 2 when appropriate, but the use of the singular does not limit the discussion to only one of each component. For example, multiple processors may implement functionality attributed to the processor 202.

The processor 202 is configured to implement functions and/or process instructions for execution within computing device 200. For example, the processor 202 executes instructions stored in the memory 204 or instructions stored on the storage device 212. In some implementations, instructions stored on the storage device 212 are transferred to the memory 204 for execution at the processor 202. The memory 204, which may be a non-transient, computer-readable storage medium, is configured to store information within the computing device 200 during operation. In some implementations, the memory 204 includes a temporary memory that does not retain information stored when the computing device 200 is turned off. Examples of such temporary memory include volatile memories such as random access memories (RAM), dynamic random access memories (DRAM), and static random access memories (SRAM). The memory 204 also maintains program instructions for execution by the processor 202 and serves as a conduit for other storage devices (internal or external) coupled to the computing device 200 to gain access to the processor 202.

The storage device 212 includes one or more non-transitory computer-readable storage media. The storage device 212 is provided to store larger amounts of information than the memory 204, and in some instances, configured for long-term storage of information. In some implementations, the storage device 212 includes non-volatile storage elements. Non-limiting examples of non-volatile storage elements include flash memories, magnetic hard discs, optical discs, solid state drives, resistive or forms of electrically programmable memories (EPROM) or electrically erasable and programmable (EEPROM) memories.

The network interfaces 206 are used to communicate with external devices and/or servers. The computing device 200 may include multiple network interfaces 206 to facilitate communication via multiple types of networks. The network interfaces 206 may include network interface cards, such as Ethernet cards, optical transceivers, radio frequency transceivers, or any other type of device that can send and receive information. Non-limiting examples of the network interfaces 206 include radios compatible with several Wi-Fi standards, 3G, 4G, Long-Term Evolution (LTE), 5G, Bluetooth®, Bluetooth Low Energy, etc.

The computing device 200 may also be equipped with the one or more output devices 208. The output device 208 is configured to provide output to a user using tactile, audio, and/or video information. Examples of the output device 208 include a display screen (a liquid crystal display (LCD) display, LCD/light emitting diode (LED) display, organic LED display, etc.), a sound card, a video graphics adapter card, speakers, magnetics, or any other type of device that may generate an output intelligible to a user.

The computing device 200 is equipped with the one or more input devices 210. The input devices 210 are configured to receive input from a user or the environment where the computing device 200 resides. In certain instances, the input devices 210 include devices that provide interaction with the environment through tactile, audio, and/or video feedback. These may include a presence-sensitive screen or a touch-sensitive screen, a mouse, a keyboard, a video camera, microphone, a voice responsive system, or any other type of input device.

As discussed in connection with FIG. 1, the question-answering computing system 106 provides a span in a context that contains an answer to a given question. That is, the question-answering computing system 106 implements an open-domain (i.e., domain agnostic) question answering system that receives a question and provides a location in a document containing an answer to the question. The question-answering computing system 106 solves a span-based, open-domain question answering problem. That is, given a natural language question $q_1$, the question-answering computing system 106 identifies a document $c_{q1}$ from a collection of documents D. The question-answering computing system 106 returns an answer $x_{q1}$ as the span between two positions ($s_{q1}$ and $e_{q1}$) within the identified document $c_{q1}$, $s_{q1}$ and $e_{q1}$ are indices that identify start and stop positions, respectively, within the identified document $c_{q1}$.

Figure 3:
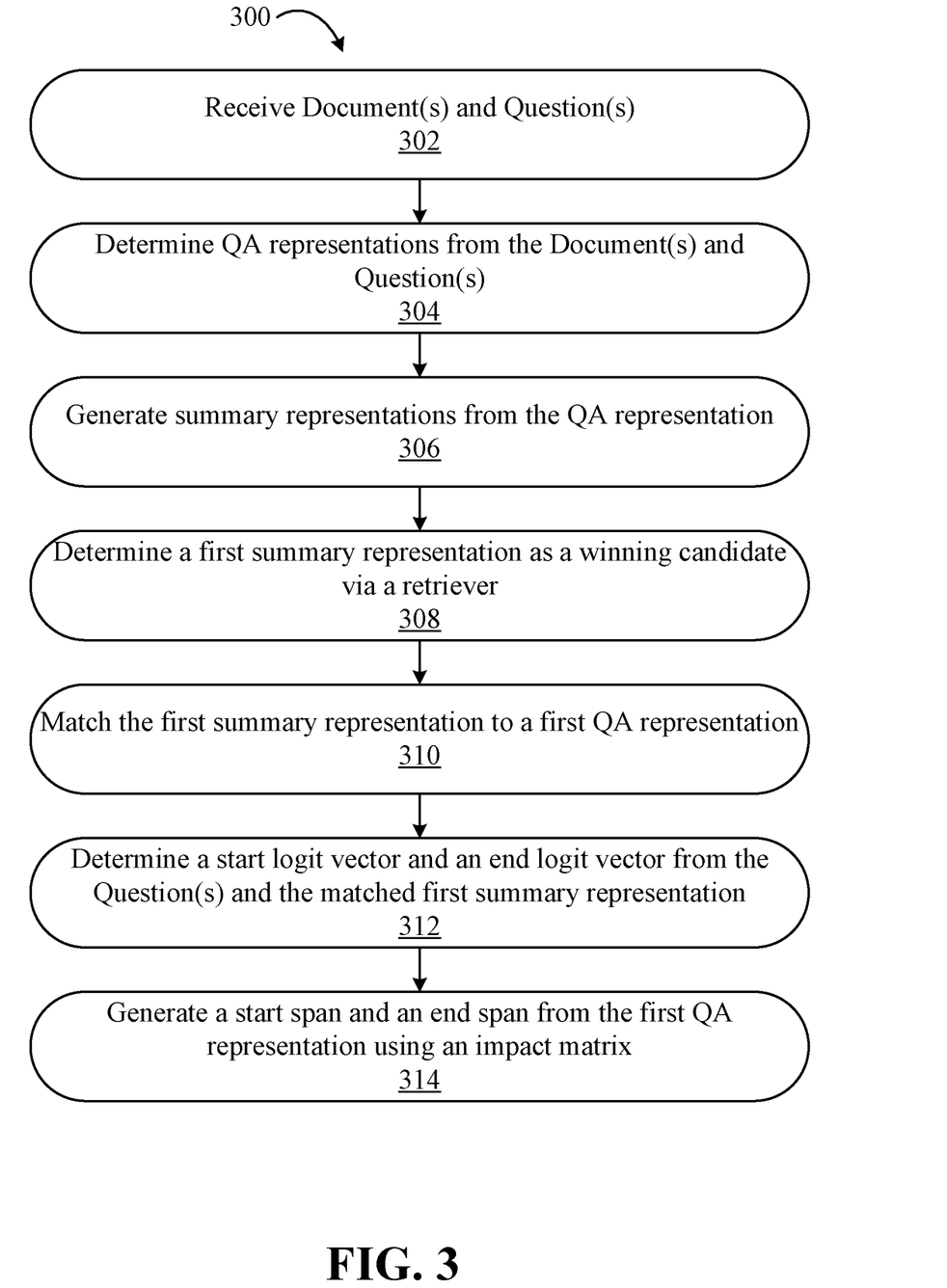
FIG. 3 is a flow diagram showing steps for generating an answer to a question, according to some implementations of the disclosure.

FIG. 3 a flow diagram showing a process 300 for generating the answer $x_{q1}$ to the question $q_1$ using the question-answering computing system 106, according to some implementations of the disclosure. At step 302, the question-answering computing system 106 receives documents and questions. In some implementations, the question-answering computing system 106 receives the collection of documents D and the question $q_1$. The collection of documents D can include one document $c_0$ or can include a plurality of documents $c_0, c_1, \ldots, c_N$, where N is an integer greater than or equal to 1. As discussed in connection with FIG. 1, documents can include articles, manuals, books, writings, etc. Furthermore, as discussed above in connection with FIG. 1, documents and contexts are used interchangeably. That is, the collection of documents D can be referred to as a collection of contexts D, implying that the collection of contexts D can include a plurality of contexts $c_0, c_1, \ldots, c_N$. The collection of documents D and/or the question $q_1$ can be received from the client device 102, the database 110, and/or the data source 104 as discussed above in connection with FIG. 1.

At step 304, optionally, the question-answering computing system 106 determines QA representations from the collection of documents and the question. For example, the collection of documents D and the question $q_1$ are provided in QA representation form as $(q_1, c_0), (q_1, c_1), (q_1, c_2) \ldots$. In some implementations, the QA representation takes the form of the plurality of documents. That is, the QA representation merely includes the contexts $c_0, c_1, \ldots, c_N$.

At step 306, the question-answering computing system 106 generates summary representations from the QA representations. In some implementations, the summarizer engine 114 receives as input each document $c_x$ in the collection of documents D and provides as output summaries and associated score vectors. For example, document $c_0$ is summarized as summary $summ_0$ having a score vector $score_0$, document $c_1$ is summarized as summary $summ_1$ having a score vector $score_1$, and so on. Each summary $summ_x$ can include one or more sentences, and each sentence includes one or more tokens. In some implementations, the summarizer model used is TextRank which scores each sentence in each of the documents $c_x$, and the sentences in each of the documents $c_x$ with the highest scores are retained as the summaries $summ_x$. In some implementations, as discussed above in connection with FIG. 1, "n" such sentences with the highest scores can be retained in the summary.

At step 308, the question-answering computing system 106 determines a first summary representation as a winning candidate. The retriever engine 116 takes as input the question $q_1$ and each of the summaries $summ_x$ to determine which one of the summaries $summ_x$ identifies a document $c_x$ that may include an answer to the question $q_1$. In some implementations, similarity scores are generated for each pair of the question $q_1$ and the summaries $summ_x$. For example, similarity score $sim\_score_0$ is generated for the pair $(q_1, summ_0)$, similarity score $sim\_score_1$ is generated for the pair $(q_1, summ_1)$, similarity score $sim\_score_2$ is generated for the pair $(q_1, summ_2)$, and so on. The similarity scores $sim\_score_x$ can be determined using dot products and cosine similarities, count vectorizer, or bag-of-words retrieval function (e.g., BM25). The highest of the similarity scores $sim\_score$, is chosen as the winning candidate. For example, if the similarity score $sim\_score_2$ is the highest of the similarity scores, then the summary $summ_2$ is determined to be the first summary representation (i.e., chosen as the winning candidate).

At step 310, the question-answering computing system 106 matches the first summary representation to a first QA representation. For example, if the first summary representation is determined to be summary $summ_2$, then the first QA representation is determined to be $(q_1, c_2)$. In some implementations, the first QA representation is determined to be just $c_2$. In some implementations, the summary $summ_2$ is generated using an extractive summarizer. That is, each of the sentences in the summary $summ_2$ exists verbatim in the document $c_2$. The retriever engine 116 aligns the indexes of the sentences in the summary $summ_2$ to their relevant positions in the document $c_2$. A matched version of the summary $summ_2$ with updated indexes is obtained as the matched first summary representation $summ\_matched_2$. The matched first summary representation ensures that sentences in the first summary representation are in the same order as the first QA representation.

At step 312, the question-answering computing system 106 determines a start logit vector $v_s$ and an end logit vector $v_e$ from the question $q_1$ and the matched first summary representation $summ\_matched_x$. In some implementations, the transformer engine 118 receives the question $q_1$ and the matched first summary representation $summ\_matched_2$, and applying the BERT model, obtains the start logit vector $v_s$ and the end logit vector $v_e$. The start logit vector $v_s$ is a vector of length l, and the end logit vector $v_e$ is a vector of length l. l is the length of the document $c_x$. Length, in this context, refers to number of tokens. The BERT model can provide an initial span by finding a start index and an end index. The start index is the index that contains the maximum value of all the values in the start logit vector $v_s$, and the end index is the index that contains the maximum value of all the values in the end logit vector $v_e$. It is desired that the initial span have a start index that is lower than the end index, but this is not always guaranteed.

At step 314, the question-answering computing system 106 generates a start span and an end span from the first QA representation using an impact matrix. In some implementations, the impact matrix is an l×l matrix with rows and columns of the matrix corresponding to penalties associated with starting and ending an answer at a particular position in the document $c_x$. That is, the impact matrix can be a square matrix with dimensions equal to length of the start logit vector $v_s$ or length of the end logit vector $v_e$. The elements of the impact matrix $m_{ij}$ are computed as sum of two components (see (2) below as an example). The first component is values of the start logit vector $v_s$ and values of the end logit vector $v_e$. The second component is the sum of all length-normalized scores $t_n^k$ between the interval i and j. $t_n^k$ is a length normalized summarizer-based score for the $k^{th}$ token in the $n^{th}$ sentence. All tokens/words have the same score in the same sentence since $t_n^k$ is computed by dividing per-sentence relevance score assigned by an extractive summarizer for the $n^{th}$ sentence by the length of the $n^{th}$ sentence.

The impact matrix can be organized as a triangular matrix, where matrix elements for i=j and i>j are set to $-\infty$ to reduce overall computational complexity and to remove invalid spans. That is, restricting i to be less than j ensures a start span will not have an index that is greater than a stop span. The impact matrix takes the form of $M \in \mathbb{R}^{l \times l}$ and can be expressed as (1). $-\infty$ is provided as an example, but any large negative number can be used in some implementations.

$$M = \begin{bmatrix} -\infty & m_{12} & \ldots & m_{1l} \\ -\infty & -\infty & \ldots & \vdots \\ \vdots & \vdots & \ldots & M_{l-1,l} \\ -\infty & -\infty & \ldots & -\infty \end{bmatrix} \quad (1)$$

For i<j, values of the impact matrix $m_{ij}$ can be expressed as (2).

$$m_{ij} = v_s[i] + v_e[j] + \alpha \times \sum_{k=i}^{j} t_n^k \quad (2)$$

In (2), $\alpha$ is a hyperparameter. In an example, $\alpha$ can take on a real value of 2.2. The impact matrix allows for determining the indexes that contain the answer by determining i* and j*. Where $$(i^*, j^*) = \underset{i,j}{\mathrm{argmax}} M_{ij}.$$

That is, the row and column where the maximum value of $m_{ij}$ resides in the matrix M. i* is the start span and j* is the end span. In the example, the impact matrix $M \in \mathbb{R}^{l \times l}$ thus combines the start logit vector $v_s$, the end logit vector $v_e$, and the length normalized scores $t_n^k$, and the indexes (i*, j*) associated with the largest value (i.e., the largest element) in the impact matrix M corresponds to the start span i* and the end span j*. The answer is included in the start span i* and the end span j*. Elements of the impact matrix $m_{ij}$ can be interpreted as probability that the indexes of $m_{ij}$ include the answer, thus the largest $m_{ij}$ is most likely to include the answer.

Figure 4:
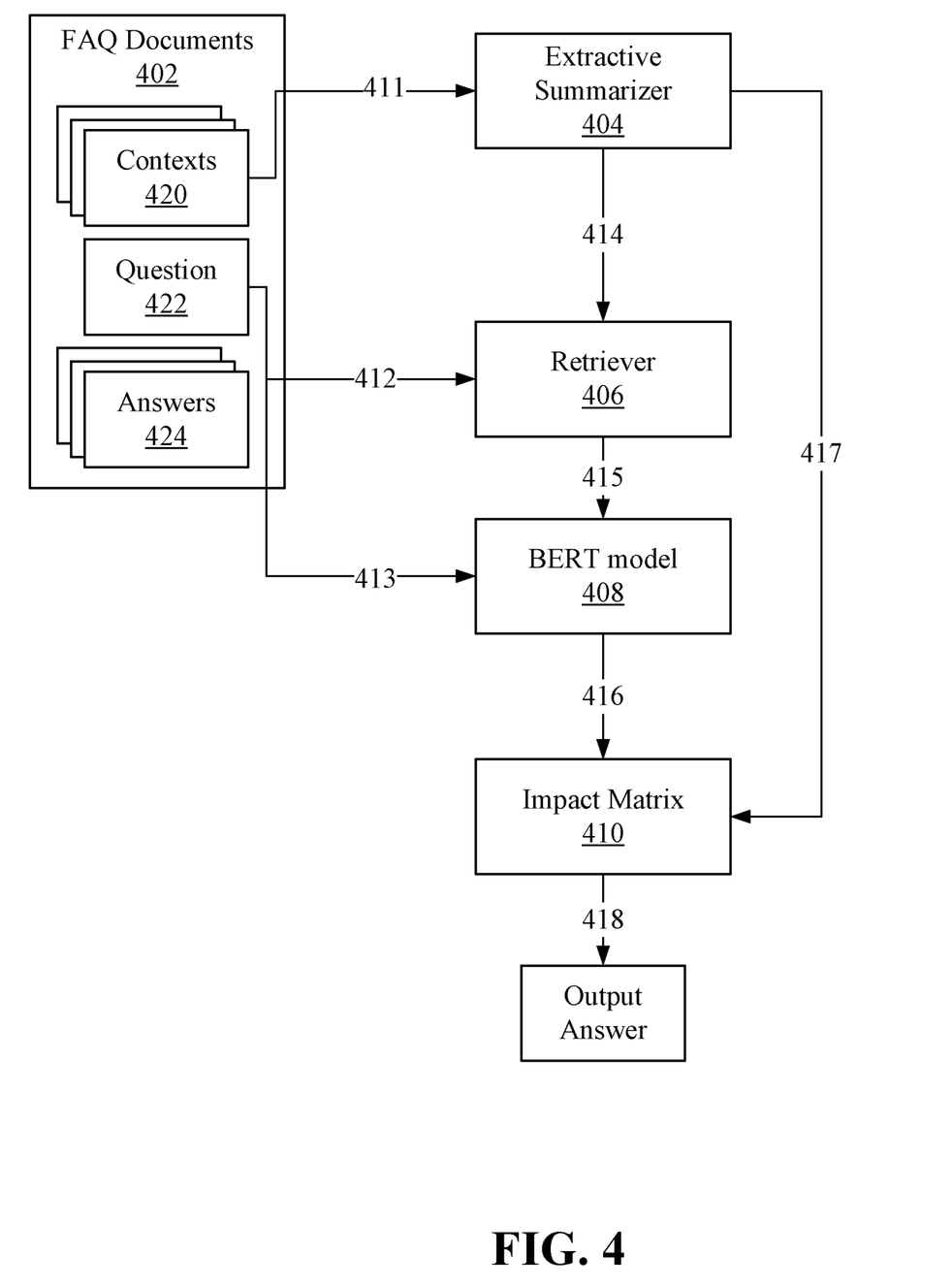
FIG. 4 illustrates a block diagram for generating an answer to a question using frequently answered questions documents, according to some implementations of the present disclosure.

FIG. 4 provides an example of applying the process 300 to FAQ documents 402, according to some implementations of the present disclosure. The FAQ documents 402 are preprocessed into chunks indicated as contexts 420. In some implementations, each of the contexts 420 is limited in character and/or word length to what a typical summarizer can process. For example, some summarizers can handle about 512 tokens, so the contexts 420 an be limited to a same number of tokens. The FAQ documents 402 can include one or more questions, with question 422 highlighted in FIG. 4 for processing. The FAQ documents 402 can include a plurality of answers 424. The plurality of answers 424 are not used in the example of FIG. 4, but in some implementations, the plurality of answers can be used by the evaluation engine 122 (FIG. 1) to verify answers provided by the impact matrix engine 120 (FIG. 1). The FAQ documents 402 represented in FIG. 4 can be easily provided in QA representation as discussed above in connection with step 304 of FIG. 3. The flow diagram of FIG. 4 will be described using a first example and a second example.

In the first example, the FAQ documents 402 includes a question "Where did Sally go first?", an answer "The barn", and a paragraph "Sally went to the barn. She had coffee. Then Sally went to the zoo." The contexts 420 recites the paragraph {"Sally went to the barn. She had coffee. Then Sally went to the zoo."}. The question 422 recites {"Where did Sally go first?"}. The answers 424 recites {"The barn."}. In FIG. 4, the answers 424 are not used, but as described in connection with FIG. 1, answers can be used by the evaluation engine 122 to generate metrics.

In the second example, the FAQ documents 402 includes a question "Where did Sally go first?", an answer "The barn", and a paragraph "Sally returned from the zoo. Before that she had gone to the barn. She had a coffee too." The contexts 420 recites the paragraph {"Sally returned from the zoo. Before that she had gone to the barn. She had a coffee too."}. The question 422 recites {"Where did Sally go first?"}. The answers 424 recites {"The barn."}.

The contexts 420 are provided to an extractive summarizer 404 as indicated by arrow 411. The extractive summarizer 404 generates summary representations of the contexts 420 similar to that discussed above in connection to step 306 of FIG. 3. The summary representations are provided to a retriever 406 as indicated by arrow 414. The retriever 406 also receives the question 422 as indicated by arrow 412. In some implementations, the retriever 406 is a Contextualized Late interaction over BERT (ColBERT) retriever. Using the summary representations and the question 422, the retriever 406 selects one of the contexts 420 as the candidate where the answer to the question 422 resides.

Referring to the first example, the extractive summarizer 404 can provide the following summary representation {[summary], [score]}:={["Sally went to the barn.", "Then Sally went to the zoo", "She had a coffee."], [0.40912294577466846, 0.35692493701017125, 0.23395211721516007]}. As shown, the order of the sentences in the summary representation is different from the order of the sentences in the contexts 420 based on the sentence scores corresponding to each of the sentences. This is a short example, hence the number of sentences in the summary is the same as the number of sentences in the context.

Referring to the second example, the extractive summarizer 404 can provide the following summary representation {[summary], [score]}:={["Before that she had gone to the barn.", "Sally returned from the zoo.", "She had a coffee too."], [0.4026950001244235, 0.3206861886154048, 0.2766188112601716]}. Similar to the first example, in the second example, the sentences are reordered in the summary representation based on the sentence scores corresponding to each of the sentences.

The retriever 406 provides the selected one of the summaries associated with a specific one of the contexts 420 to a BERT model 408 as indicated by arrow 415. The BERT model 408 also receives the question 422 as indicated by arrow 413. The BERT model 408 performs step 312 and determines start logit and end logit vectors which are provided by the arrow 416.

In the short examples provided above, each example only has one context. Thus, in the first example, the retriever 415 will select the contexts 420 as provided, that is, {"Sally went to the barn. She had coffee. Then Sally went to the zoo."}. The BERT model 408 applied to the question {"Where did Sally go first?"} and the context {"Sally went to the barn.

She had coffee. Then Sally went to the zoo."} provides start logits and end logits that indicate the potential answer to be "the zoo".

In the second example, the retriever 415 selects the contexts 420 as provided, that is, {"Sally returned from the zoo. Before that she had gone to the barn. She had a coffee too."}. The BERT model 408 applied to the question and the context {"Sally returned from the zoo. Before that she had gone to the barn. She had a coffee too."} provides start logits and end logits that indicate the potential answer to be "the barn".

The start logit and end logit vectors from the BERT model 408 are adjusted by an impact matrix 410. The impact matrix 410 also receives the summarizer scores from the extractive summarizer 404. Elements of the impact matrix 410 are determined according to (1) and (2) above. The impact matrix 410 provides start span and end span as the output answer as indicated by arrow 418.

In the first example, the impact matrix 410 adjusts the start logits and end logits to obtain the start span and end span to provide the answer as "the barn. She had a coffee. Then Sally went to the zoo."

In the second example, the impact matrix 410 adjusts the start logits and end logits to obtain the start span and end span to provide the answer as "the barn." As indicated in the two examples, the impact matrix 410 improves the potential answer, which is the barn. If the start logit and end logit were used as indicating the answer, the answer would be incorrect for the first example (i.e., "the zoo"). Therefore, the impact matrix 410 improves the answer beyond the BERT model 408.

Embodiments of the present disclosure provide a domain-agnostic answering system that utilizes summarizers to reduce the information in one or more contexts. The summarizers provide summaries associated with the contexts, and these summaries can be stored in memory. In some implementations, questions provided to the domain-agnostic answering system trigger a search of the summaries to determine which summary includes the answer to the question. In some implementations, questions provided to the domain-agnostic answering system trigger as search of the summaries to determine which context may include an answer to the question. A transformer is then used to determine start and end logits in either the summary or the context associated with the summary. An impact matrix is used to adjust the start and end logits to obtain start and end spans for the final answer. In some implementation, an evaluation engine can provide scores for assessing the final answer.

While the present disclosure has been described with reference to one or more particular implementations, those skilled in the art will recognize that many changes may be made thereto without departing from the spirit and scope of the present disclosure. Each of these embodiments and implementations and obvious variations thereof is contemplated as falling within the spirit and scope of the present disclosure, which is set forth in the claims that follow.

What is claimed is:

1. A domain-agnostic answering system, the domain-agnostic answering system including a non-transitory computer-readable medium storing computer-executable instructions thereon such that when the computer-executable instructions are executed, the domain-agnostic answering system is configured to:
   receive a question and one or more documents;
   generate, via a summarizer, summary representations for each of the one or more documents, each summary representation including a summary having one or more sentences and a score vector including scores for each of the one or more sentences;
   determine, via a retriever, that a first summary representation of the summary representations is a winning candidate for extracting an answer to the question;
   match, via the retriever, the first summary representation to a first document in the one or more documents to obtain reference indexes of sentences in the first summary representation in portions of the first document, wherein a matched first summary representation has reference indexes corresponding to indexes in the first document;
   determine, via a transformer, a start logit vector and an end logit vector from the question and the matched first summary representation, the start logit vector and the end logit vector including at least part of the answer to the question; and
   generate, via an impact matrix, a start span and an end span from the start logit vector, the end logit vector, and the score vector associated with the first summary representation,
   wherein the impact matrix is organized to ensure that a value of the start span is less than a value of the end span, and wherein the start span and the end span represent the answer to the question.

2. The system of claim 1, wherein the transformer is a bidirectional encoder representations from transformers (BERT) transformer.

3. The system of claim 1, wherein the summarizer is a TextRank summarizer.

4. The system of claim 1, wherein the retriever is a ColBERT retriever.

5. The system of claim 1, wherein the one or more documents have a maximum number of tokens, and the first document of the one or more documents and a second document of the one or more documents originate from a same data source.

6. The system of claim 5, wherein the maximum number of tokens is 512 tokens.

7. The system of claim 1, wherein the impact matrix is a square matrix with dimensions equal to a length of the start logit vector or a length of the end logit vector.

8. The system of claim 1, wherein the one or more documents include articles, books, manuals, or any combination thereof.

9. The system of claim 8, wherein the start span and the end span are generated by the impact matrix based on a probability of likelihood of the answer.

10. The system of claim 9, wherein elements of the impact matrix indicate the probability of likelihood of the answer.

11. The system of claim 9, wherein indexes of the largest element of the impact matrix indicate the start span and the end span.

12. The system of claim 1, wherein the impact matrix is a triangular matrix.

13. A method performed by a domain-agnostic answering system, the method comprising:
   receiving a question and one or more documents;
   generating, via a summarizer of the domain-agnostic answering system, summary representations for each of the one or more documents, each summary representation including a summary having one or more sentences and a score vector including scores for each of the one or more sentences;
   determining, via a retriever of the domain-agnostic answering system, that a first summary representation of the summary representations is a winning candidate for extracting an answer to the question;

matching, via the retriever, the first summary representation to a first document in the one or more documents to obtain reference indexes of sentences in the first summary representation in portions of the first document, wherein a matched first summary representation has reference indexes corresponding to indexes in the first document;

determining, via a transformer of the domain-agnostic answering system, a start logit vector and an end logit vector from the question and the matched first summary representation, the start logit vector and the end logit vector including at least part of the answer to the question; and generating, via an impact matrix of the domain-agnostic answering system, a start span and an end span from the start logit vector, the end logit vector, and the score vector associated with the first summary representation, wherein the impact matrix is organized to ensure that a value of the start span is less than a value of the end span, and wherein the start span and the end span represent the answer to the question.

14. The method of claim 13, wherein the transformer is a bidirectional encoder representations from transformers (BERT) transformer.

15. The method of claim 13, wherein the summarizer is a TextRank summarizer.

16. The method of claim 13, wherein the retriever is a ColBERT retriever.

17. The method of claim 13, wherein the impact matrix is organized to ensure that a value of the start span is less than a value of the end span.

18. A non-transitory computer readable medium containing instructions thereon for configuring a domain-agnostic answering system to perform a method comprising:

receiving a question and one or more documents;

generating, via a summarizer of the domain-agnostic answering system, summary representations for each of the one or more documents, each summary representation including a summary having one or more sentences and a score vector including scores for each of the one or more sentences;

determining, via a retriever of the domain-agnostic answering system, that a first summary representation of the summary representations is a winning candidate for extracting an answer to the question;

matching, via the retriever, the first summary representation to a first document in the one or more documents to obtain reference indexes of sentences in the first summary representation in portions of the first document, wherein a matched first summary representation has reference indexes corresponding to indexes in the first document;

determining, via a transformer of the domain-agnostic answering system, a start logit vector and an end logit vector from the question and the matched first summary representation, the start logit vector and the end logit vector including at least part of the answer to the question; and generating, via an impact matrix of the domain-agnostic answering system, a start span and an end span from the start logit vector, the end logit vector, and the score vector associated with the first summary representation, wherein the impact matrix is organized to ensure that a value of the start span is less than a value of the end span, and wherein the start span and the end span represent the answer to the question.

19. The system of claim 18, wherein the start span and the end span are generated by the impact matrix based on a probability of likelihood of the answer.

20. The system of claim 1, wherein the sentences in the first summary representation appear in a different order compared to sentences in the first document, and the first summary representation has a highest associated similarity score compared to other summary representations in the summary representations.

* * * * *